US008602878B2

(12) United States Patent
Bennett

(10) Patent No.: US 8,602,878 B2
(45) **Date of Patent: *Dec. 10, 2013**

(54) GAMING MACHINE WITH A DYNAMIC BONUS MODIFIER

(75) Inventor: Nicholas Luke Bennett, Manly Vale (AU)

(73) Assignee: Aristocrat Technologies Australia Pty, Ltd (AU)

(*) Notice: Subject to any disclaimer, the term of this patent is extended or adjusted under 35 U.S.C. 154(b) by 0 days.

This patent is subject to a terminal disclaimer.

(21) Appl. No.: 13/333,466

(22) Filed: Dec. 21, 2011

(65) Prior Publication Data

US 2012/0157194 A1 Jun. 21, 2012

Related U.S. Application Data

(63) Continuation of application No. 11/914,415, filed as application No. PCT/AU2006/000654 on May 17, 2006, now Pat. No. 8,100,761.

(30) Foreign Application Priority Data

May 17, 2005 (AU) ................................ 2005902513

(51) Int. Cl.
*A63F 9/24* (2006.01)
*A63F 13/00* (2006.01)
*G06F 17/00* (2006.01)

(52) U.S. Cl.
USPC .................................. 463/25; 463/16; 463/20

(58) Field of Classification Search
USPC ................ 463/16–20, 25, 29; 273/138.1, 139
See application file for complete search history.

(56) References Cited

U.S. PATENT DOCUMENTS

| | | | | |
|---|---|---|---|---|
| 5,788,573 | A * | 8/1998 | Baerlocher et al. | 463/16 |
| 5,823,874 | A * | 10/1998 | Adams | 463/17 |
| 5,848,932 | A * | 12/1998 | Adams | 463/20 |
| 5,941,773 | A * | 8/1999 | Harlick | 463/26 |
| 6,004,207 | A * | 12/1999 | Wilson et al. | 463/20 |
| 6,142,873 | A * | 11/2000 | Weiss et al. | 463/20 |
| 6,234,897 | B1 * | 5/2001 | Frohm et al. | 463/20 |

(Continued)

FOREIGN PATENT DOCUMENTS

| | | |
|---|---|---|
| DE | 401477 A | 9/1924 |
| GB | 2387703 A | 10/2003 |

(Continued)

OTHER PUBLICATIONS

International Search Report corresponding to International Application No. PCT/AU2006/000654, 6 pages, mailed Jul. 25, 2006.

*Primary Examiner* — Milap Shah
(74) *Attorney, Agent, or Firm* — McAndrews, Held & Malloy, Ltd.

(57) ABSTRACT

There is disclosed a game feature forming part of a gaming machine apparatus (10). The game feature (42) is configured to award a bonus outcome that is determined on the basis of a dynamic bonus modifier (44). The game feature (42) additionally includes a motion indicator (65) associated with the dynamic bonus modifier (44), and during play a value of said dynamic award modifier is adjusted in relation to at least one parameter of a movement of the motion indicator (65). The bonus modifier (44) may be adjusted in concert with, or in response to, the parameter.

15 Claims, 14 Drawing Sheets

(56) References Cited

U.S. PATENT DOCUMENTS

| | | | | |
|---|---|---|---|---|
| 6,558,253 | B1 * | 5/2003 | DeSimone et al. | 463/20 |
| 6,715,756 | B2 * | 4/2004 | Inoue | 273/143 R |
| 7,341,511 | B2 * | 3/2008 | Fiden et al. | 463/16 |
| 7,682,244 | B1 * | 3/2010 | Luciano et al. | 463/25 |
| 7,833,092 | B2 * | 11/2010 | Wolf et al. | 463/16 |
| 8,100,761 | B2 * | 1/2012 | Bennett | 463/25 |
| 2002/0016200 | A1 * | 2/2002 | Baerlocher et al. | 463/20 |
| 2002/0042294 | A1 * | 4/2002 | Pau et al. | 463/16 |
| 2002/0094856 | A1 * | 7/2002 | Bennett et al. | 463/16 |
| 2003/0236115 | A1 * | 12/2003 | Chamberlain | 463/16 |
| 2004/0000754 | A1 * | 1/2004 | Inoue | 273/143 R |
| 2004/0048645 | A1 * | 3/2004 | Webb et al. | 463/16 |
| 2004/0053673 | A1 * | 3/2004 | Mishra | 463/20 |
| 2004/0053683 | A1 * | 3/2004 | Hartl et al. | 463/25 |
| 2004/0147306 | A1 * | 7/2004 | Randall et al. | 463/20 |
| 2004/0171417 | A1 * | 9/2004 | Beaulieu et al. | 463/20 |
| 2004/0214630 | A1 * | 10/2004 | Mayeroff | 463/20 |
| 2005/0026673 | A1 * | 2/2005 | Paulsen et al. | 463/16 |
| 2005/0043081 | A1 * | 2/2005 | Baerlocher | 463/20 |
| 2005/0054413 | A1 * | 3/2005 | Randall et al. | 463/16 |
| 2005/0148383 | A1 * | 7/2005 | Mayeroff | 463/20 |
| 2005/0159209 | A1 * | 7/2005 | Fiden et al. | 463/20 |
| 2007/0054723 | A1 * | 3/2007 | Mattice et al. | 463/16 |
| 2008/0004098 | A1 * | 1/2008 | Bennett | 463/16 |
| 2009/0117961 | A1 * | 5/2009 | Bennett et al. | 463/16 |

FOREIGN PATENT DOCUMENTS

| | | | |
|---|---|---|---|
| WO | 90/00920 | A1 | 2/1990 |
| WO | WO02/04080 | A1 | 1/2002 |
| WO | WO03/027797 | A2 | 4/2003 |

* cited by examiner

GAMING MACHINE WITH A DYNAMIC BONUS MODIFIER

RELATED APPLICATIONS

This application is a continuation of U.S. application Ser. No. 11/914,415, filed on Jul. 1, 2008, which is a National Stage Application of the International Application PCT/AU2006/00654 having a filing date of May 17, 2006, which claims priority to Australian Patent Application 2005902513 filed May 17, 2005, which is also incorporated herein by reference in its entirety.

BACKGROUND OF THE INVENTION

This invention relates to games playable on a gaming apparatus such as a gaming machine. More particularly, the invention relates to a game including a bonus feature including a dynamic 5 award modifier.

Players who regularly play gaming machines quickly tire of particular games and therefore it is necessary for manufacturers of these machines to develop innovative game features which add interest and variety to the games.

In response to this need, suppliers of gaming devices and systems have attempted to provide the sought after variety, while still developing games that comply with the relevant regulations in the jurisdiction of the gaming venue operator. Suppliers of gaming devices therefore are faced with restrictions on the types of games and gaming apparatus that are allowable, both in terms of the prevailing regulations and in terms of providing a return on investment to the gaming venue operators.

In addition, it is important that a player be able to understand the operation of a game quickly so that the player promptly feels that they are in control of game play and can therefore extract maximum entertainment from the game.

The wheel is a very popular game feature in gaming machines. Much of the appeal of wheel-type game features lies in the fact that that wheel-type games tend to be intuitive to players and visually appealing.

In order to increase and maintain players' interest in wheel-type game features it is also desirable to offer a wide range of bonuses in a game, including a number of large bonuses. However, achieving this outcome may be complicated by a requirement in some markets (e.g. Australia) that the odds for wheel-type features (and other typical casino devices) in gaming machines must display the expected odds of that device. Thus achieving both of these desirable outcomes may lead to overly complicated game layouts which are undesirable and may diminish the, intuitive nature and visual appeal of wheel-type game features.

In addition, the geometry of a wheel or any other multi-prize or outcome indicator such as a die only allows for the clear display of a limited or fixed number of prize outcomes.

BRIEF SUMMARY OF THE INVENTION

In broad concept there is provided a game feature forming part of a gaming machine game, said game feature being configured to award a bonus outcome from one or more awardable bonus outcomes, wherein at least one of said awardable bonus outcomes is determined on the basis of a dynamic bonus modifier, said game feature additionally including a motion indicator associated with the dynamic bonus modifier, wherein during play a value of said dynamic award modifier is adjusted in relation to at least one parameter of a movement of the motion indicator.

The bonus modifier may be adjusted in concert with, or in response to, said parameter.

According to a first aspect of the invention there is provided a gaming machine having a display and a game controller arranged to control images of symbols displayed on the display, the game controller being arranged to control a game wherein at least one random event is caused to be displayed on the display and, if a predefined winning event occurs, the machine awards a bonus, the gaming machine further comprising a bonus game feature which is triggerable in the event of a trigger condition occurring in a base game, said bonus game feature being configured to award a bonus outcome from one or more awardable bonus outcomes, wherein at least one of said awardable bonus outcomes is determined on the basis of a dynamic bonus modifier, said game feature additionally including a motion indicator associated with the dynamic bonus modifier, wherein during play a value of said dynamic bonus modifier is adjusted in concert with at least one parameter of a movement of the motion indicator.

In a particularly preferred embodiment the dynamic bonus modifier is incremented in concert with at least one parameter of a movement of the motion indicator.

The game feature preferably comprises, one or more indicator portions, corresponding to the award of a respective bonus wherein at least one of said bonuses has a bonus value determined on the basis of said dynamic bonus modifier.

In certain embodiments the bonus associated with one of said indicator portions has its value determined on the basis of said dynamic bonus modifier. In an alternative embodiment the bonuses associated with all of said indicator portions have their values determined on the basis of said dynamic bonus modifier.

Preferably, the dynamic bonus modifier includes a series of markers on the basis of which the bonuses associated with at least one of said indicator portions are determined.

A bonus associated with an indicator portion' can be determined in accordance with a predetermined function of the dynamic bonus modifier. Preferably a bonus value is determined by multiplying a base bonus component by said dynamic bonus modifier. Alternatively, a bonus associated with a bonus indicator can be determined by adding said dynamic bonus modifier to a base bonus component. In a further alternative, the bonus associated with a bonus indicator can be equal to said dynamic award modifier.

Preferably the motion indicator is cyclical. In a particularly preferred embodiment the motion indicator is a wheel or a graphical/video simulation thereof.

In one embodiment the indicator portions corresponding to respective awardable bonuses are arranged relative to the motion indicator such that an endpoint of the motion of the motion indicator determines which bonus value from said one or more awardable bonus values is awarded.

The motion indicator can include one or more outcome markers associated with respective indicator portions. The visual appearance of the outcome marker and/or indicator portions can be sequentially emphasised to convey motion of the motion indicator.

The dynamic bonus modifier of said game feature is preferably varied in concert with one of the following parameters of a movement of the motion indicator:

a speed of the motion of the motion indicator, a duration of the motion of the motion indicator, an extent of angular rotation of the motion indicator, including the number of laps or complete 25 cycles or rotations of the motion indicator, a maximum rotational speed of the motion indicator.

In a preferred embodiment the motion indicator is a wheel, having a plurality of indicator portions arranged as sectors of the wheel. Preferably the motion indicator includes a plurality of outcome markers arranged around the wheel such that each indicator portion has one or more outcome markers associated therewith. In use the motion of the wheel is conveyed by the sequential visual emphasis of the outcome markers.

The game feature can additionally include a bonus display configured to display a bonus value determined on the basis of the dynamic bonus modifier. The bonus display can be configured to display the dynamic bonus modifier.

In one embodiment the dynamic bonus modifier is a bonus multiplier. In an alternative 10 embodiment the dynamic bonus multiplier is a progressive jackpot bonus multiplier.

The invention extends to gaming machine comprising a bonus indicator including at least one outcome indicating part associated with a bonus outcome and at least one marker, the at least one outcome indicating part and the at least one marker being movable relative to one another, and a bonus modifier for adjusting the bonus outcome on the basis of or in concert with a parameter of the relative motion between the at least one outcome indicating part and the at least one marker.

The gaming machine can include a plurality of outcome indicating parts associated with one or more possible bonus outcomes. Preferably, each bonus outcome is associated with a respective outcome indicating part. The gaming machine can include a plurality of markers. In such an embodiment each marker can be associated with one of said outcome indicating parts.

The relative motion of the at least one marker and the at least one outcome indicating parts may be simulated or actual motion.

The marker may be constituted by moving, or stationary background, for example when a plurality of outcome indicating parts are provided and a parameter of the relative motion between the background and the outcome indicating parts is the bonus modifier.

In a preferred embodiment the bonus indicator is a graphical implementation. In a first embodiment the bonus indicator may be implemented on the same display on which the underlying base game is played. Alternatively, the bonus indicator may be implemented on a gaming machine which includes a second display. Alternatively the bonus indicator can include a mechanical device.

In a certain embodiment the bonus outcome may be directly adjusted. In such an embodiment the bonus modifier adjusts the bonus outcome by applying a predetermined function to a base bonus component. In one embodiment the base bonus component is multiplied by the bonus modifier. In an alternative embodiment the bonus modifier is added to the base bonus component.

Alternatively the bonus outcome can be adjusted indirectly. In such an embodiment the bonus award can determined by an award of a base bonus component and an additional award of an additional bonus determined on the basis of the bonus modifier. In such an embodiment the base bonus component additional bonus can be of a different type. In an example embodiment the base bonus component is preferably an award of a number of bonus games, and the bonus modifier is a bonus multiplier to be applied to all bonus values awarded during the bonus games.

The bonus outcome can be determined on the basis of a combination of a direct and indirect adjustment of a bonus award.

In another aspect the present invention provides a program configured to control the operation of a game played on a gaming machine, wherein at least one random event is caused to be displayed on a display of said gaming machine, and if a predefined winning event occurs, the program causes the machine to award a bonus, wherein in the event of a trigger condition occurring in a base game, the program further causes the gaming machine to implement a bonus game feature, said bonus game feature being configured to award a bonus value from one or more awardable bonus values, wherein at least one of said awardable bonus values is determined on the basis of a dynamic award modifier, said program being further configured to cause the gaming machine to control a motion indicator associated with the dynamic award modifier, such that during play a value of said dynamic award modifier is adjusted in concert with at least one parameter of the movement of the motion indicator.

In an embodiment the program causes the gaming machine to increment the dynamic award modifier in concert with at least one parameter of a movement of the motion indicator.

The game feature preferably comprises one or more indicator portions corresponding to the award of a respective bonus wherein at least one of said bonuses has a bonus value determined on the basis of said dynamic bonus modifier.

In certain embodiments the bonus associated with one of said indicator portions has its value determined on the basis of said dynamic bonus modifier. In an alternative embodiment the bonuses associated with all of said indicator portions have their values determined on the basis of said dynamic bonus modifier.

Preferably, the dynamic bonus modifier includes a series of markers on the basis of which the bonuses associated with at least one of said indicator portions are determined.

A bonus associated with an indicator portion can be determined in accordance with a predetermined function of the dynamic bonus modifier. Preferably a bonus value is determined by multiplying a base bonus component by said dynamic bonus modifier. Alternatively, a bonus associated with a bonus indicator can be determined by adding. said dynamic bonus modifier to a base bonus component. In a further alternative, the bonus associated with a bonus indicator can be equal to said dynamic award modifier.

Preferably the motion indicator is cyclical in a particularly preferred embodiment the motion indicator is a wheel or a graphical/video simulation thereof.

In one embodiment the indicator portions corresponding to respective awardable bonuses are arranged relative to the motion indicator such that an endpoint of the motion of the motion indicator determines which bonus value from said one or more awardable bonus values is awarded.

The motion indicator can include one or more outcome markers associated with respective indicator portions. The visual appearance of the outcome marker and/or indicator portions can be sequentially emphasised to convey motion of the motion indicator.

The program preferably causes the game controller to vary the dynamic bonus modifier of said game feature in concert with one of the following parameters of a movement of the motion indicator:

a speed of the motion of the motion indicator, a duration of the motion of the motion indicator, an extent of angular rotation of the motion indicator, including the number of laps or complete cycles or rotations of the motion indicator, a maximum rotational speed of the motion indicator.

In a preferred embodiment the motion indicator is a wheel, having a plurality of indicator portions arranged as sectors of the wheel. Preferably the motion indicator includes a plurality of outcome markers arranged around the wheel such that each indicator portion has one or more outcome markers associated therewith. In use the motion of the wheel is conveyed by the sequential visual emphasis of the outcome markers.

The program preferably causes the game controller to generate a bonus display configured to display a bonus value determined on the basis of the dynamic bonus modifier. The bonus display can be configured to display the dynamic bonus modifier.

In one embodiment the dynamic bonus modifier is a bonus multiplier. In an alternative embodiment the dynamic bonus multiplier is a progressive jackpot bonus multiplier.

The program can include, without limit, software and/or firmware, and can comprise one or more application programs or distributed applications configured to cooperate to control the operation of a gaming machine.

In a further aspect the present invention relates to a gaming machine operating under control of such an program.

The present application also provides a data storage means storing thereon an program of the type described above. The data storage means can include one or more of the following types of data storage: RAM, ROM or programmable ROM.

BRIEF DESCRIPTION OF SEVERAL VIEWS OF THE DRAWINGS

The invention is now described by way of example only with reference to the accompanying drawings, in which.

DETAILED DESCRIPTION OF THE INVENTION

Figure 1:
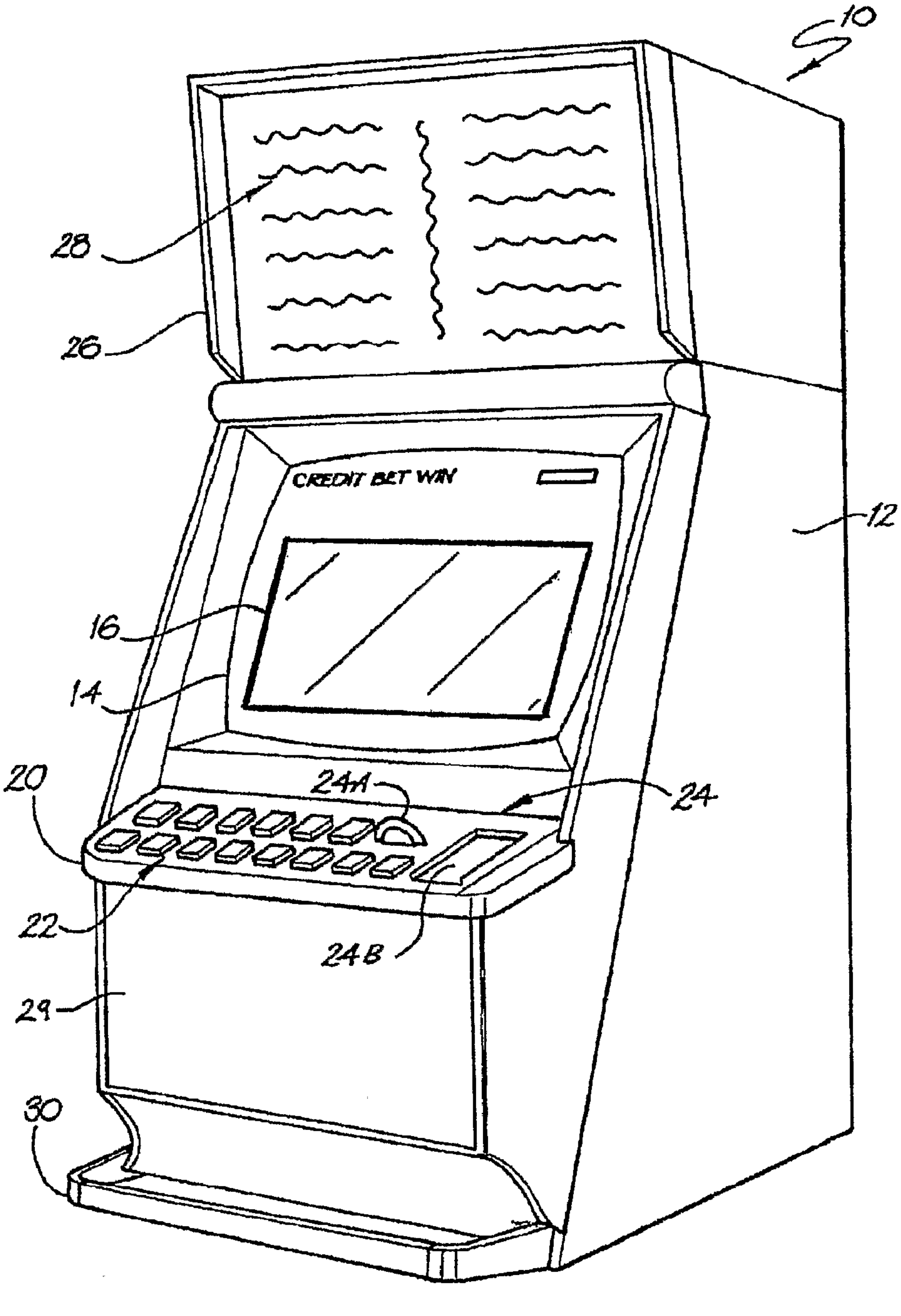
FIG. 1 shows a perspective view of a gaming machine.

In FIG. 1 of the accompanying drawings, a gaming machine suitable for implementing the present invention is generally referenced by arrow 10. The gaming machine 10 is one example of a gaming apparatus that is suitable to implement the present invention.

The gaming machine 10 includes a console 12 having a display 14 on which is displayed representations of a game 16, that can be played by a player. A mid-trim 20 of the gaming machine 10 houses a bank of buttons 22 for enabling a player to play the game 16. The mid-trim 20 also houses a credit input mechanism 24 including a coin input chute 24A and a bill collector 24B. A top box 26 may carry artwork 28, including for example, pay tables and details of bonus awards and other information or images relating to the game. Further artwork and/or information may be provided on the front panel 29 of the console 12. A coin tray 30 is mounted beneath the console 12 for cash payouts from the gaming machine 10.

The display 14 shown in FIG. 1 is in the form of a video display unit, particularly a cathode ray tube screen device. Alternatively, the display 14 may be a liquid crystal display, plasma screen, any other suitable video display unit, or the visible portion of an electromechanical device. In this latter respect, if the game 16 is a spinning reel game, the display 14 may use a stepper motor to control the position of physical reels. The top box 26 may also be a display, for example a video display unit, which may be the same type as the display 14, or a different type of display.

Figure 2:
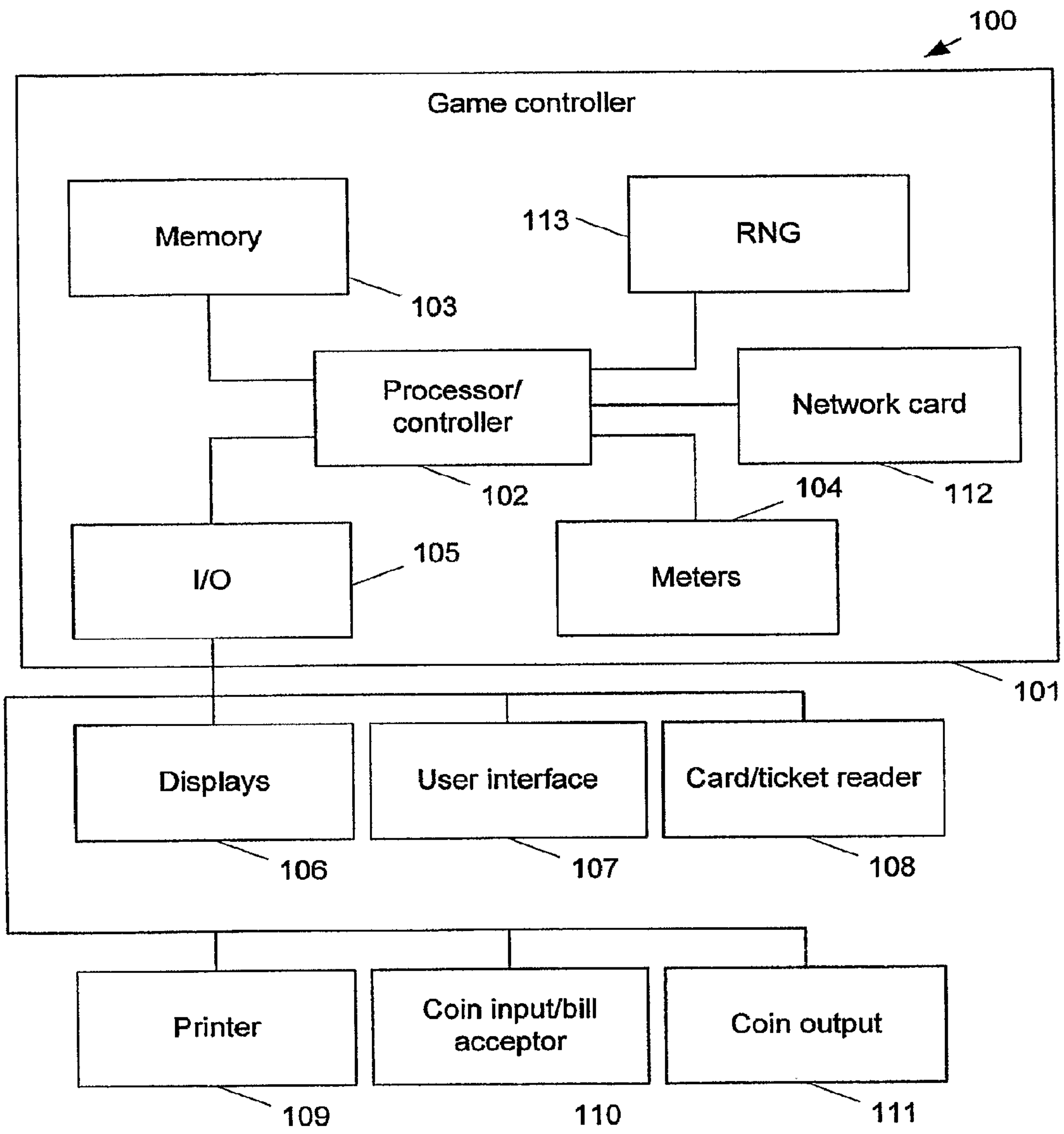
FIG. 2 shows, a block diagram of gaming apparatus suitable for implementing the present invention.

FIG. 2 shows a block diagram of a gaming apparatus, generally referenced by arrow 100, suitable for implementing the present invention. The gaming apparatus 100 may, for example, operate as a standalone gaming machine of the type shown in FIG. 1. However, the gaming apparatus 100 may alternatively operate as a networked gaming machine, communicating with other network devices, such as one or more servers or other gaming machines. The gaming apparatus 100 may have distributed hardware and software components that communicate with each other directly or through a network. Accordingly, different reference numerals have been used in FIG. 2 from FIG. 1 for components that may be equivalent.

The gaming apparatus 100 includes a game controller 101, which in the illustrated example includes a microprocessor, microcontroller, programmable logic device or other computational device 102. Instructions and data to control operation of the computational device 102 are stored in a memory 103, which is in data communication with the computational device 102.

Typically, the gaming apparatus 100 will include both volatile and non-volatile memory and more than one of each type of memory, with such memories being collectively represented by the memory 103. In addition, the computational device 102 may include two or more computational devices that each perform computational functions and which may be located locally or remotely from each other. The instructions to cause the game controller 101 to implement the present invention will be stored in the memory 103.

The gaming apparatus may include meters 104 for the purposes of regulatory compliance and also include an input/output (I/O) interface 105 for communicating with the peripheral devices of the gaming apparatus 100. The input/output interface 105 and/or the peripheral devices may be intelligent devices with their own memory for instructions and data.

In the example shown in FIG. 2, the peripheral devices that communicate with the controller are one or more displays 106, user interfaces 107, a card and/or ticket reader 108, a printer 109, a bill acceptor and/or coin input mechanism 110 and a coin output mechanism 111. Additional devices may be included in the gaming apparatus 100 or devices omitted as required. One or more of the peripheral devices may be an intelligent peripheral device, having its own memory containing instructions and data.

In addition, the gaming apparatus 100 may include a communications interface, for example a network card 112 to communicate with a network for such purposes as sending status information, accounting information and the like to a central controller, allowing communication from the central controller to the gaming apparatus 100 or for other purposes. In one embodiment, the functions of the computational device 102 may be split between a remote device and a local device, for example with game outcomes generated remotely and game graphics for the display 106 generated locally. In another embodiment, the peripheral devices only may be provided locally together with a network interface, in which case all, or nearly all intelligent devices may be located remotely of the display 106.

Figure 3:
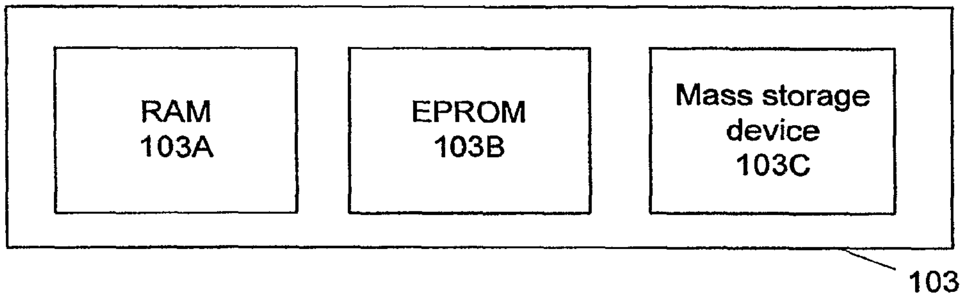
FIG. 3 shows a block diagram of components of the memory of the gaming apparatus represented in FIG. 2.

FIG. 3 shows a block diagram of the main components of the memory 103. The RAM 103A typically holds program files and data for execution by the computational controller 102. The EPROM 103B may hold be a boot ROM device and/or may contain some system or game related code. The mass storage device 103C is typically used to store game programs, the integrity of which may be verified and/or authenticated by the computational controller 102 using protected code from the EPROM 103B or elsewhere. Those skilled in the relevant arts will appreciate that alternative possibilities exist for the location of code and data.

Figure 4:
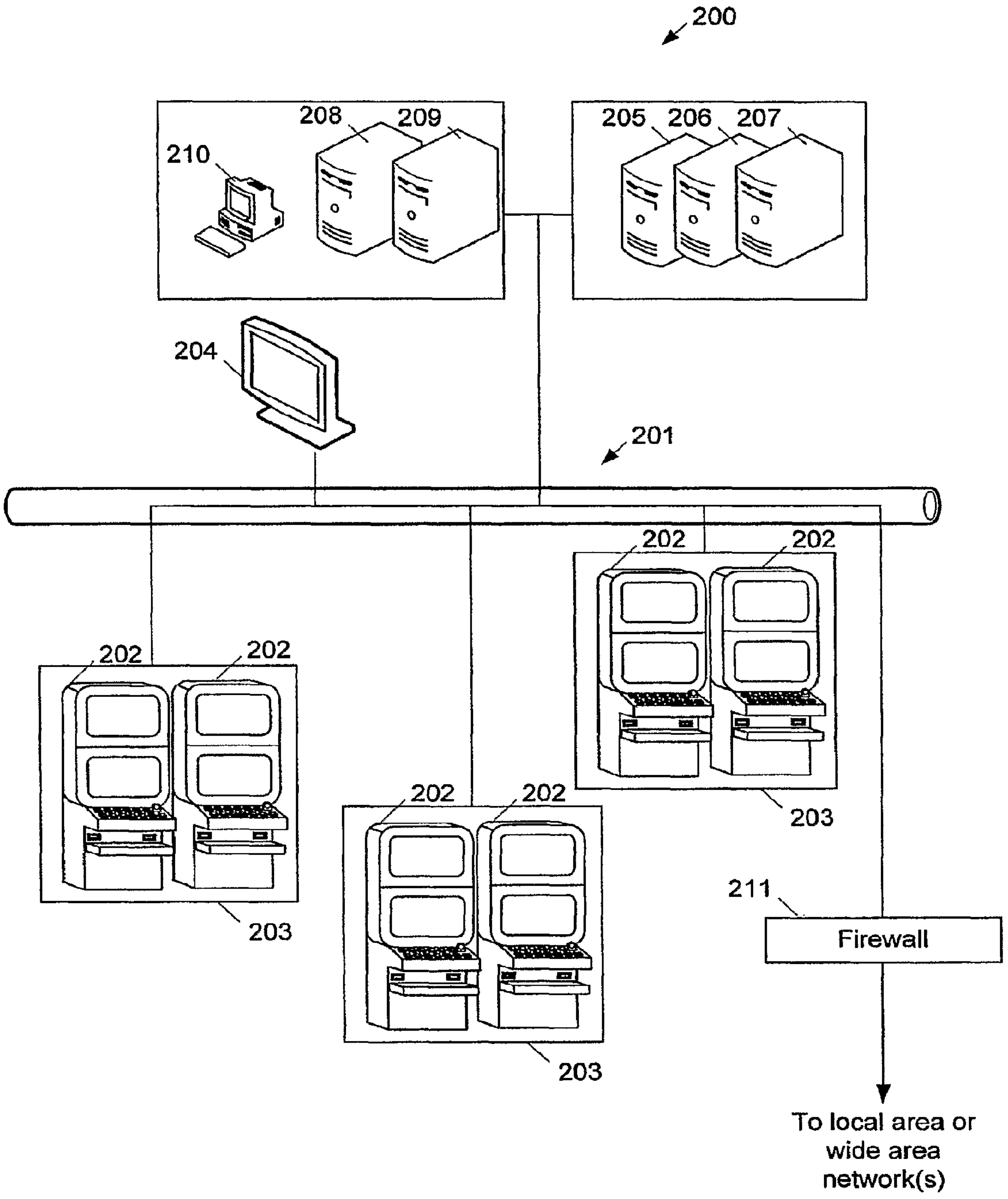
FIG. 4 shows diagrammatically, a network gaming system suitable for implementing the present invention.

FIG. 4 shows a gaming system 200. The gaming system 200 includes a network 201, which for example may be an Ethernet network. Gaming devices 202, shown arranged in three banks 203 of two gaming devices 202 in FIG. 4, are connected to the network 201. The gaming devices 202 may be gaming machines 10, as shown in FIG. 1 or form part or all of another gaming apparatus 100. Single gaming devices 202 and banks 203 containing three or more gaming devices 202 may also be connected to the network 201.

One or more displays 204 may also be connected to the network 201. The displays 204 may, for example, be associated with a bank 203 of gaming devices. The displays 204 may be used to display representations associated with game play on the gaming devices 202, and/or used to display other representations, for example promotional or informational material.

Servers may also be connected to the network 201. For example, a game server 205 may generate game outcomes for games played on the gaming devices 202, a database management server 206 may store game programs and associated data for downloading or access by the gaming devices 202 and a jackpot server 207 may control one or more jackpots associated with the gaming devices 202.

Further servers may be provided to assist in the administration of the gaming system 200, including for example a gaming floor management server 208, and a licensing server 209 to monitor the use of licenses to particular games. An administrator terminal 210 is provided to allow an administrator to run the network 201 and the devices connected to the network.

The gaming system 200 may communicate with other gaming systems, other local networks, for example a corporate network and/or a wide area network such as the Internet through a firewall 211.

Figure 5:
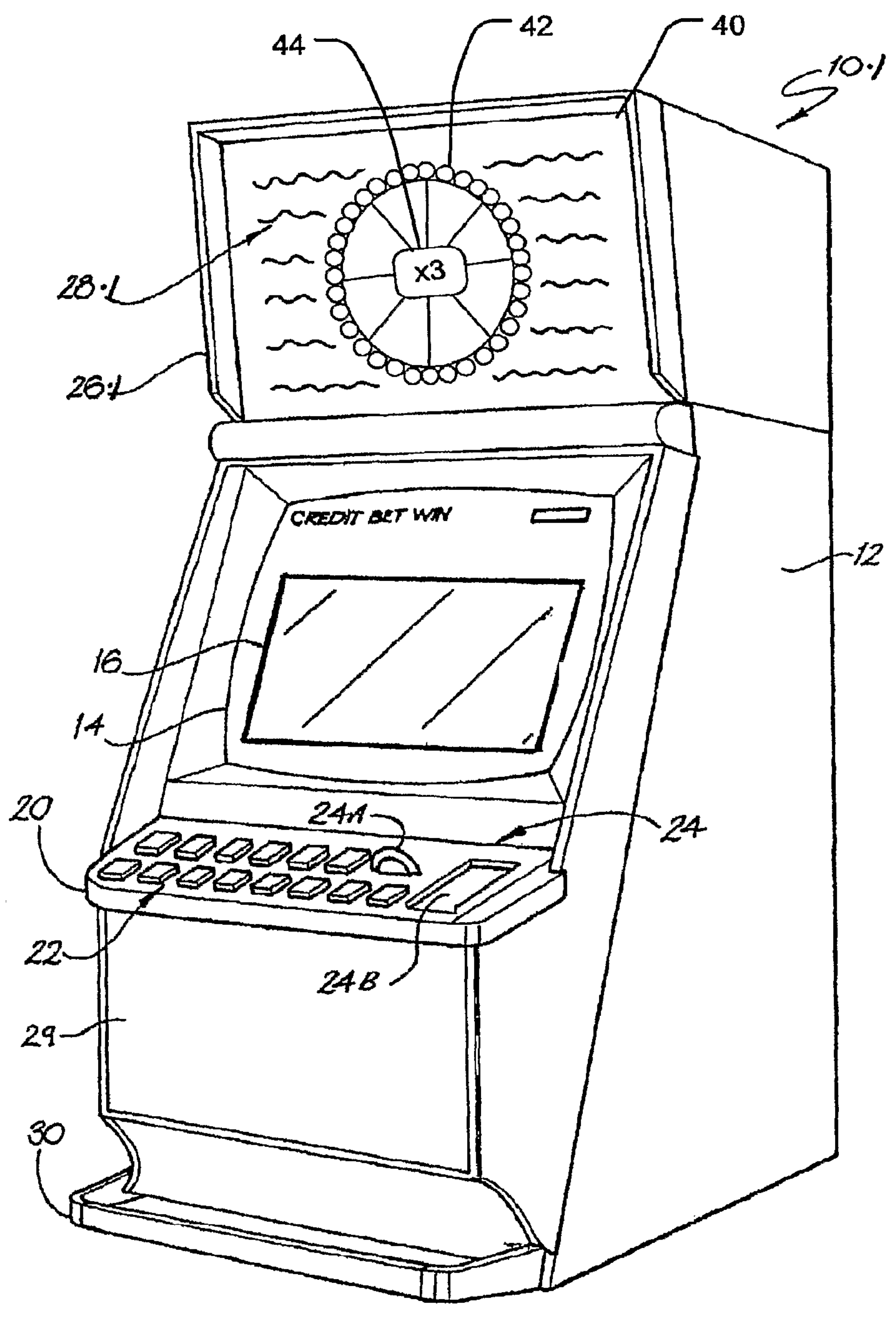
FIG. 5 shows a perspective view of a gaming machine in accordance with an embodiment of the present invention.

In FIG. 5 of the drawings, a second embodiment of the gaming machine 10.1 is shown in which the top box 26.1 of the machine includes a second screen feature 40 including a wheel type game 42 which is triggered in response to a trigger condition existing in the base game.

The wheel-type game 42 will be described in further detail further on in the specification. The wheel of the wheel feature 42 may be caused to spin. Alternatively the wheel may remain stationary, with an array of chaser lights, which may serve as both outcome markers and as motion indicators, can be used for indicating rotary motion around the wheel. The chaser lights may be real or simulated in a video implementation which provides successive sequential zones of brightness around the wheel. The wheel forms part of the feature game which is triggered from a base game played on the unit 14.

In one version of the invention, the implementation of the wheel 42 may be replaced by mechanical wheel. Both the implementation of the wheel and the mechanical wheel carry a central counter 44 which indicates a number of full rotations or cycles of the wheel or the total number of laps made by the chaser lights surrounding the wheel. The counter provides a multiplier value, the function of which will be described in more detail further on in the specification.

Figure 6:
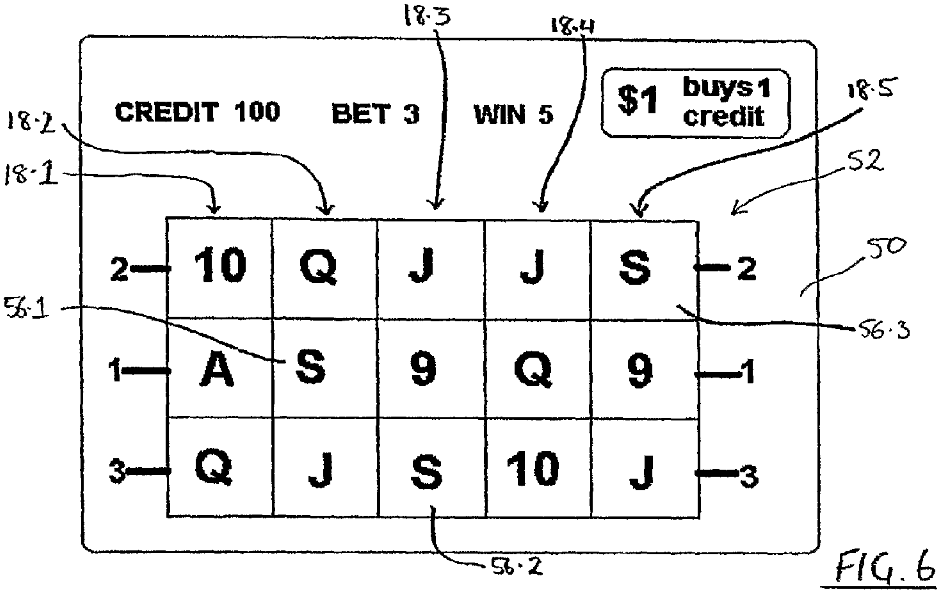
FIG. 6 shows a screen display of a base game of a game, also in accordance with an. embodiment of the invention, played on the gaming machine of FIG. 1 or 5, and displaying a triggering event.

Referring now to FIG. 6 of the drawings, reference numeral 50 generally designates a screen display of a base game 52 of a game 16 played on the gaming machine 10. The game 16 is a spinning reel game having a video representation of five spinning reels 18.1 to 18.5, each spinning reel carrying a series of images. The game 16 has three payline rows being marked with numerals 1, 2 and 3. The outcome of the game shown on screen display 50 includes a combination of three scattered "S" symbols 56.1 to 56.3. In this example, the occurrence of three or more of the "S" symbols 56 results in a trigger condition which acts to trigger a bonus game feature of the game 16. The trigger condition used to initiate the inventive game feature can be any known trigger condition, and the present invention should not be considered as being limited to the exemplary trigger condition or base game described. In the illustrative, embodiment the bonus game feature is a wheel type game feature.

Figure 7:
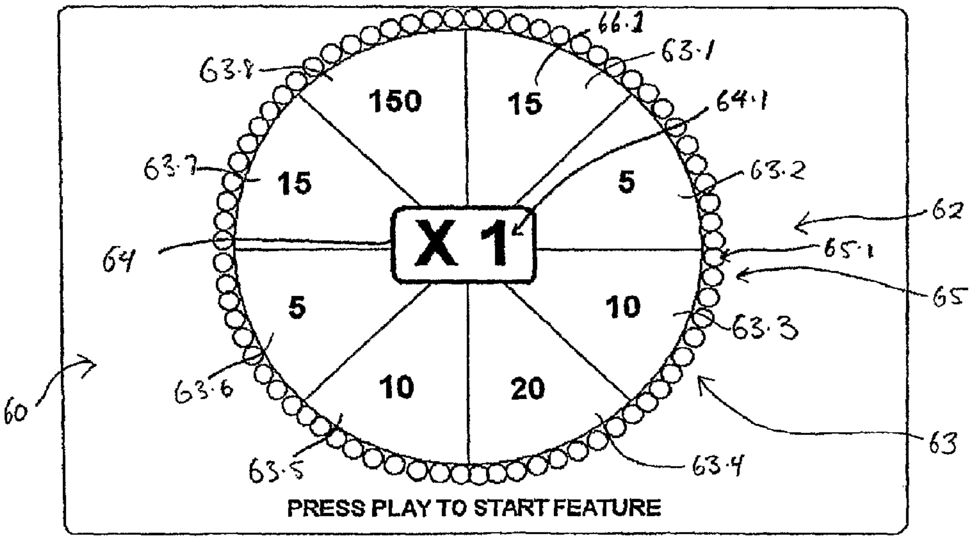
FIG. 7 shows an initial screen display of a first embodiment of a game feature according to, the present invention.

FIG. 7 shows an initial display 60 of a first embodiment of a bonus game feature 62 embodying the present invention. The bonus game feature may be displayed on the same display as the base game, as would be the case with reference to the embodiment of the gaming machine displayed in FIG. 1. The display of the bonus game feature may be effected by software underlying the implementation operating to switch the display from displaying the base game, to displaying the bonus game feature. Alternatively, the bonus game feature 62 may be displayed on a second display if the gaming machine has both first and second displays, as is the case of the gaming machine of FIG. 5.

The bonus game feature 62 includes a wheel 63 comprised of a plurality of bonus indicator portions, 63.1 to 63.8, which are arranged as sectors of the wheel. In the centre of the wheel 63 is a bonus display portion 64 configured to display a bonus multiplier 64.1. The game feature 62 also includes a motion indicator 65 comprising a ring of chaser lights e.g. 85.1 that act as outcome markers and which are arranged around the circumference of the wheel 63. In the present embodiment a plurality of outcome markers are associated with each indicator portion e.g. 63.1 to 63.8 of the wheel 63. The outcome markers e.g. 65.1 are sequentially illuminated, then extinguished, (or vice versa) in order to convey the motion of the motion indicator 65.

Each indicator portion 63.1 to 63.8 includes a bonus display e.g. 66.1 (corresponding to indicator portion 63.1) that indicates a base bonus award associated with its respective indicator portion.

The game feature is started by the player, by pressing a "play" button on the gaming machine 10. During play the chaser lights are activated and sequentially illuminated then extinguished to indicate motion of the wheel 63, and the outcome of the game is determined by the position of the last chaser light illuminated, relative to the indicator portions 63.1 to 63.8 of the wheel 63. The bonus that is awarded to a winning player is equal to the bonus value component e.g. 66.1 associated with the indicator portion e.g. 63.1, alongside which the chaser lights stop, multiplied by the multiplier value 64.1 that is displayed on the bonus display 64.

Figure 8A:
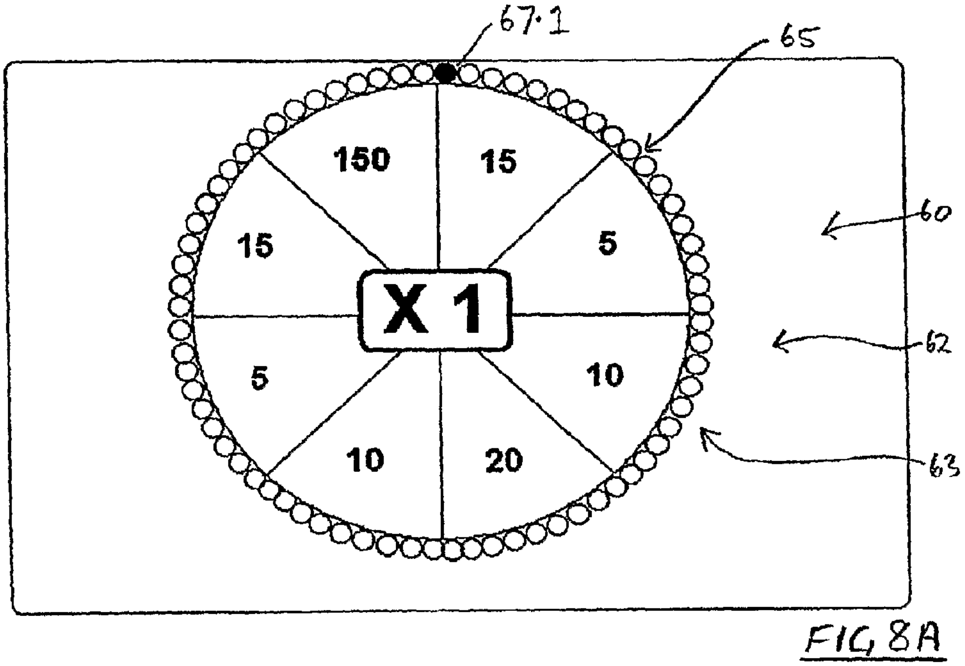
FIGS. 8A to 8F show a series of screen displays of the first embodiment of the game feature.

FIGS. 8A to SF, FIGS. 9A to 9C, FIG. 10 and FIG. 11 depict a sequence of screen displays of this embodiment of the present invention during the playing of a game. Turning first FIG. 8A which shows the display 60 depicting the wheel 63 of the game feature 62 immediately after the "play" button is pressed by the user. In this configuration an initial chaser light 67.1 of the motion indicator 65 is illuminated. When describing this and subsequent figures, common reference numerals are used to indicate corresponding parts to those shown in FIG. 7.

Figure 8B:
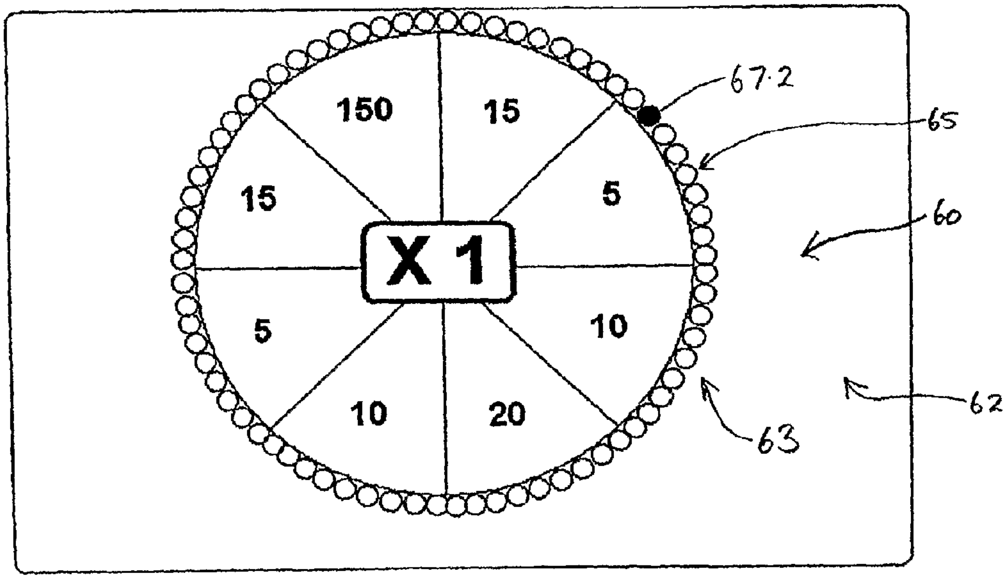
Figure 8C:
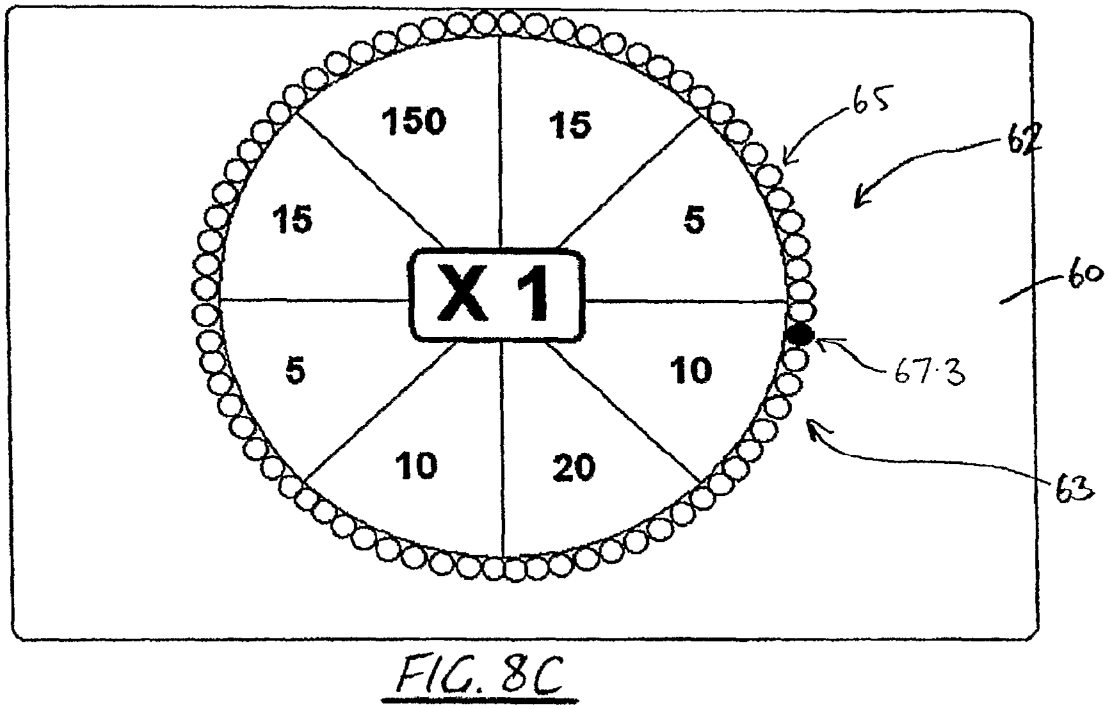
Figure 8D:
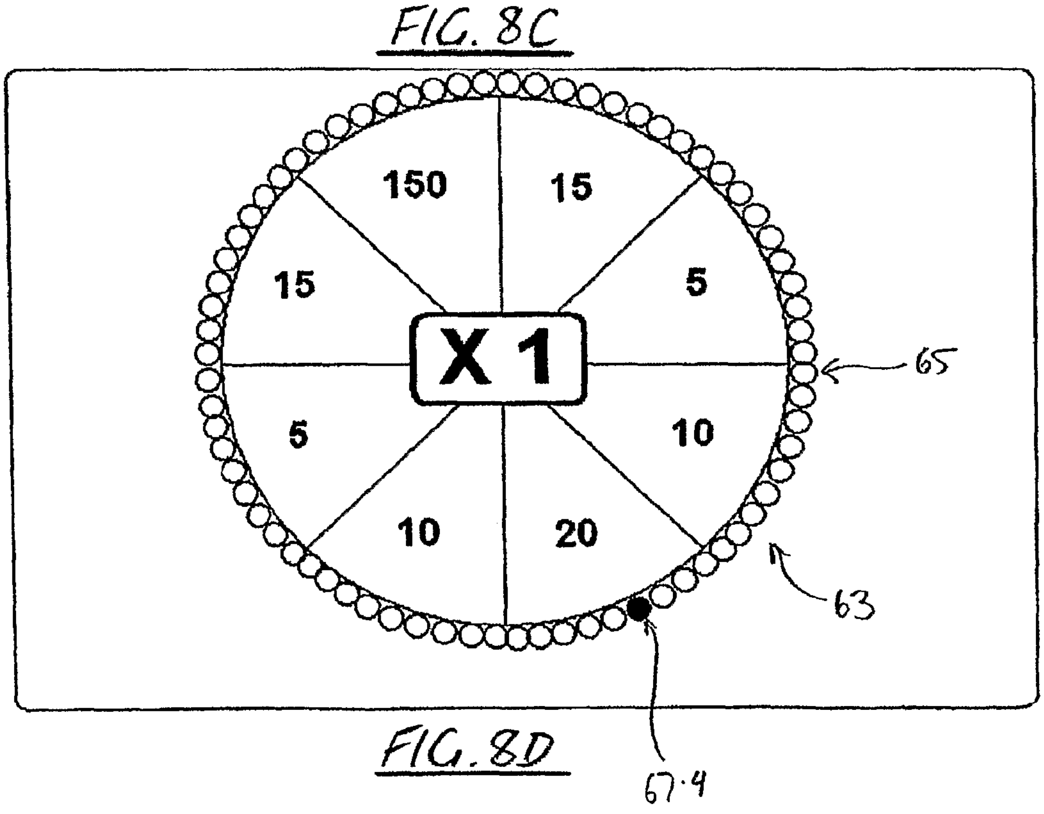
Figure 8E:
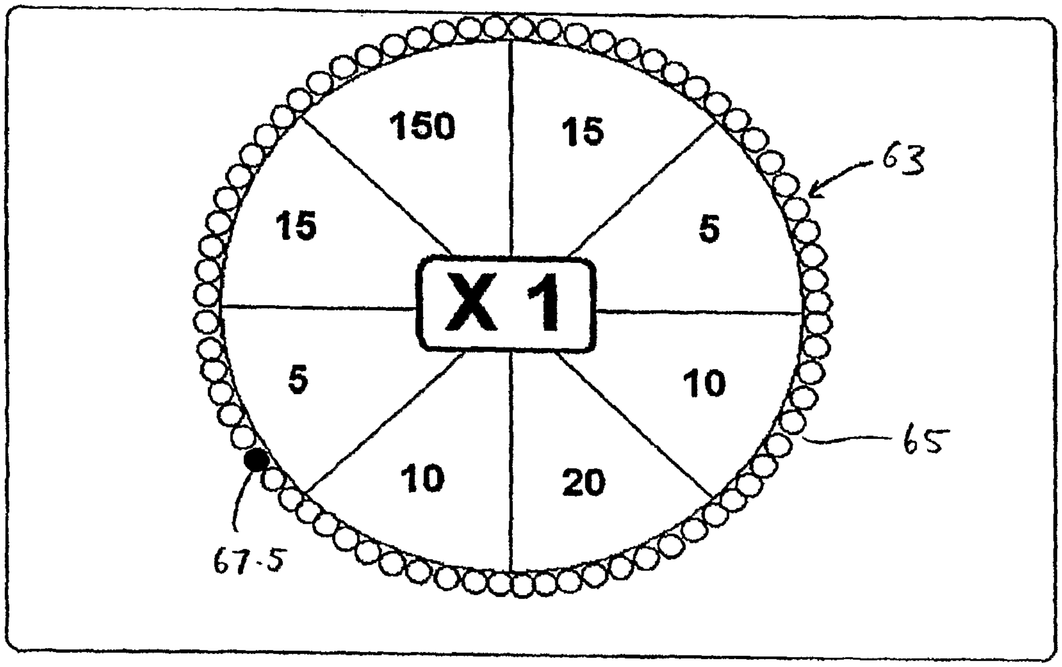
Figure 8F:
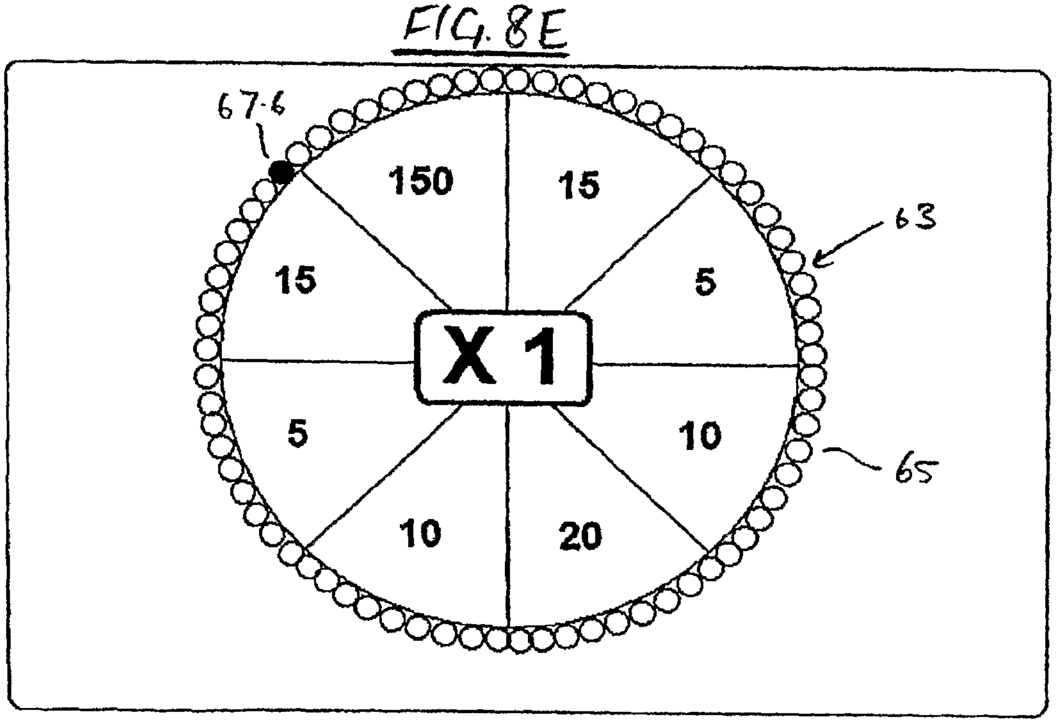

FIG. 8B shows a display 60 of the game feature 63 a short time after that of FIG. 8A. At this instant the chaser light 67.2 is illuminated thus representing a rotation of the motion indicator 65 of about 55 degrees. in the FIG. 8C, the wheel 63 of the game feature 62 is displayed 60 with the motion indicator 65 having rotated about a quarter of a revolution, as can be seen by the illumination **9*f* chaser light 67.3. FIGS. 8D, 5E and 8F show the progress of the chaser lights of the motion indicator 65 around the wheel 63. In this regard, in FIG. 8D the motion indicator 65 has rotated approximately 155, degrees relative to its starting point shown in FIG. 8A, as indicated by the illumination of chaser lights 67.4. In FIG. 8E motion indicator 65 has rotated approximately 240 degrees, as indicated by illumination of chaser light 67.5, and in FIG. 8F the motion indicator 65 has completed approximately 315° of a revolution, as indicated by illumination and chaser light 67.6**.

As will be appreciated, it is possible for motion indicator 65 to make more than one revolution during the game. In-the present embodiment, when this occurs the multiplier value 64,1 shown in the display portion 64 is incremented. More particularly, the multiplier value is varied in a predetermined manner for each revolution completed by the chaser lights around the wheel. In this case the multiplier 64.1 is incremented by one for each revolution.

Figure 9A:
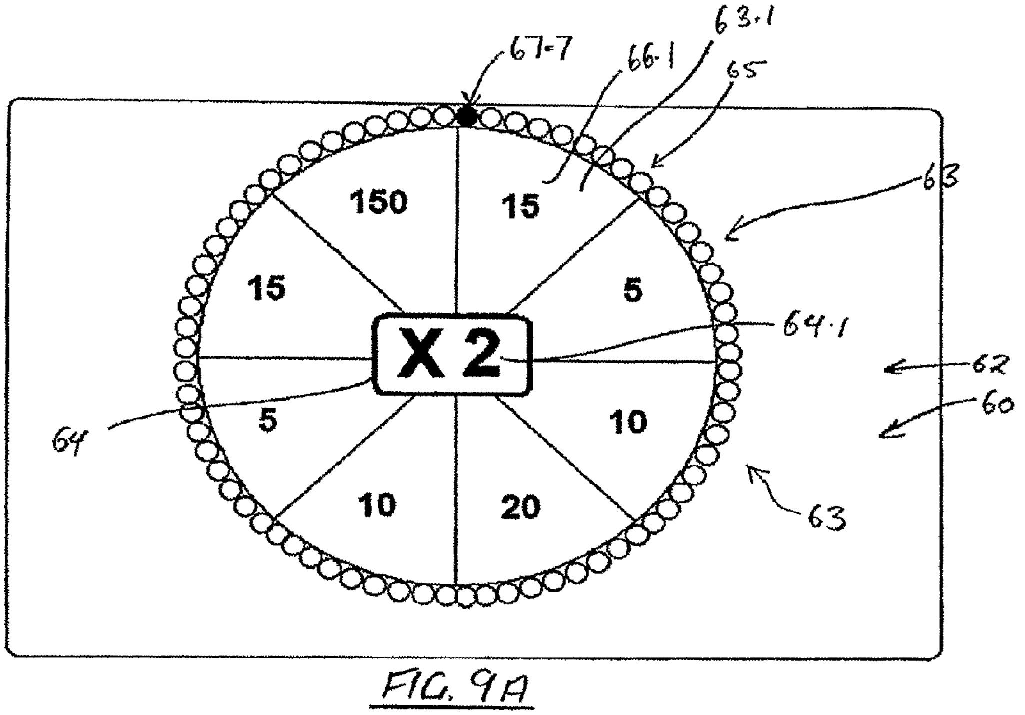
FIGS. 9A to 9C show a subsequent series of screen displays of the first embodiment of the game feature.

FIG. 9A shows the display 60 of the game feature 62 in a condition where the chaser lights of the motion indicator 65 have completed one revolution. This is indicated by the position of the initially illuminated chaser light 67.7. The multiplier value 64.1 has also been incremented in concert with a number of rotations of the wheel that the motion indicator has made. In this regard, the display portion 64 now shows a multiplier value 64.1 of "two times" Accordingly, if the motion indicator were to stop rotating at this point a bonus value would be awarded to the player equal to the bonus value 66.1 associated with the bonus indicator 63.1 multiplied by two which is the current multiplier value. Thus the bonus awarded to the player can be considered to be determined on the basis of a dynamic award modifier (being the multiplier value) and a base bonus component (being the bonus 66.1 associated with the indicator portion 63,1).

Figure 9B:
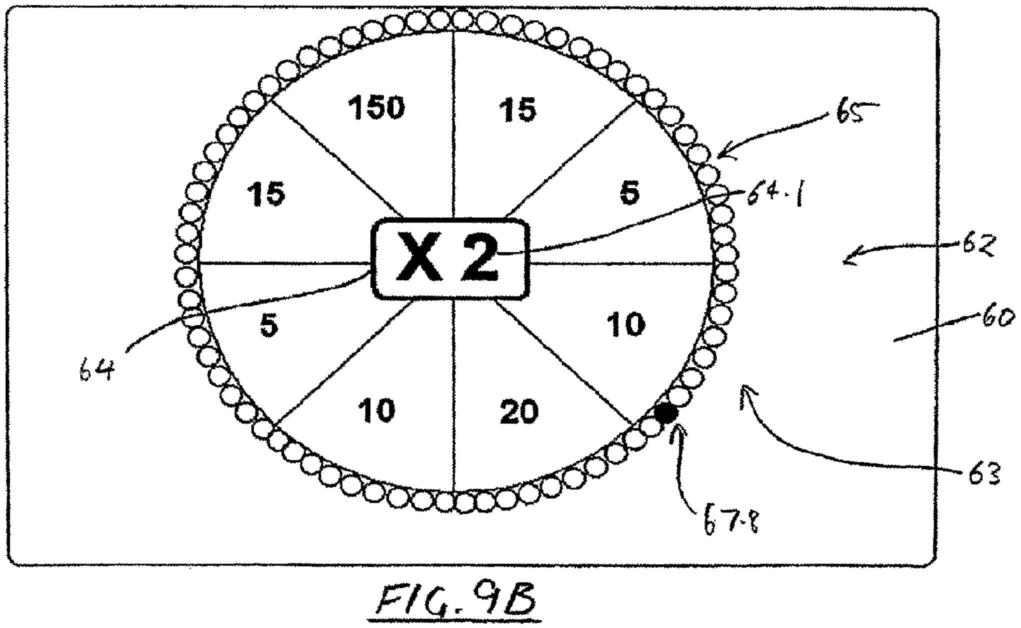

FIG. 9B depicts a situation in which the motion indicator 65 has now rotated approximately 490° from its initial position, as indicated by the illumination of chaser lights 67.8, and the "two times" multiplier 64.1 shown on the display 64. As will be appreciated the "two times" multiplier indicates that the motion indicator is in its second revolution around the wheel 63.

Figure 9C:
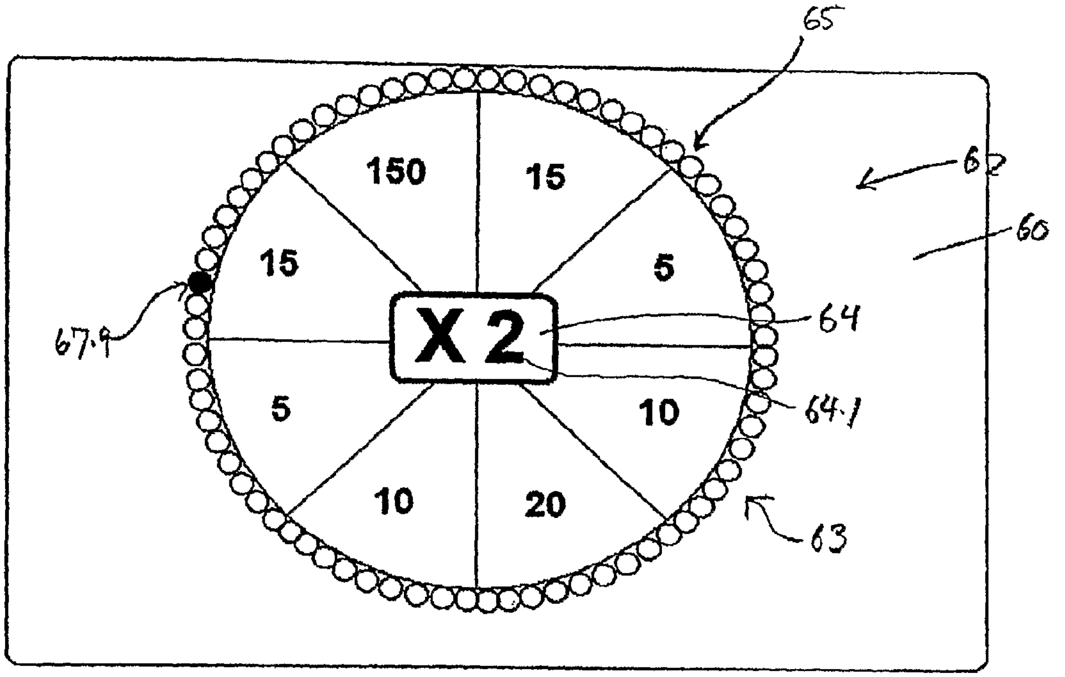

FIG. 9C shows a display 60 of the game feature 62 in a condition where the motion indicator has continued its rotation about the wheel 63 to a point approximately 645° from its initial position. This is indicated on the display 60, by the display portion 64 showing a multiplier value 64.1 of "×2", and the position of the illuminated chaser light 67.9.

Figure 10:
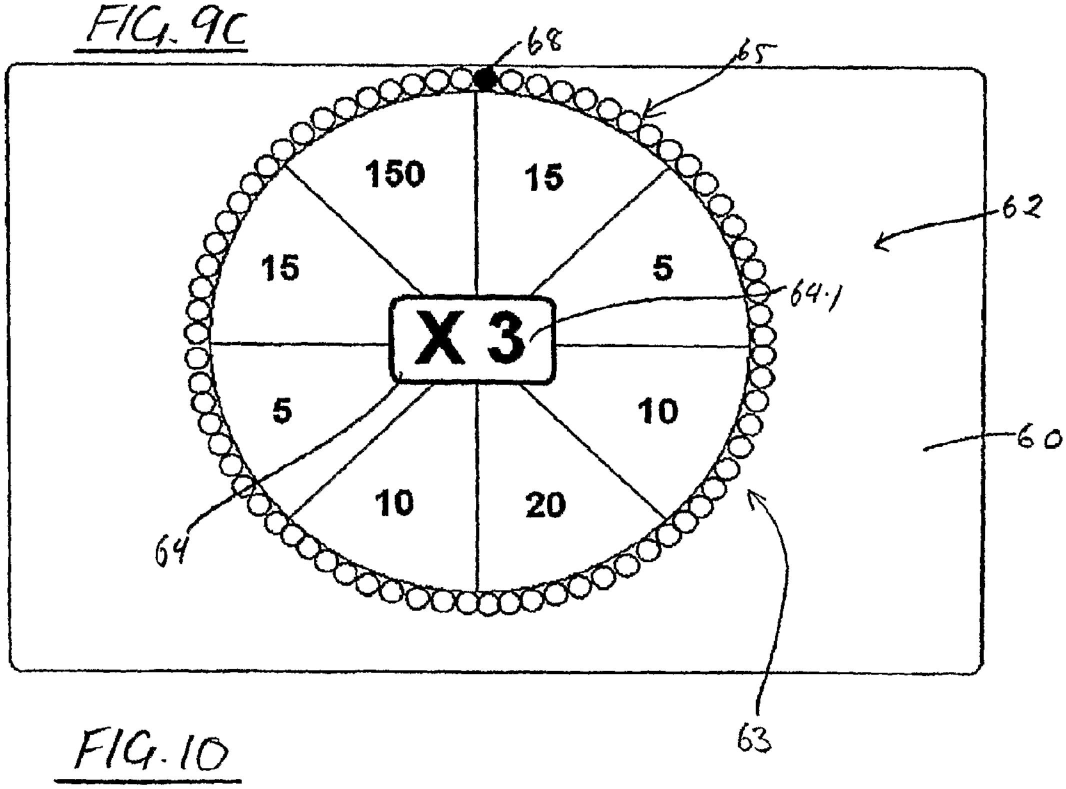
FIG. 10 shows a subsequent screen display o he first embodiment of the game feature.

Turning now to FIG. 10, the motion indicator 65 of the game feature 62 is shown at the start of its third revolution about the wheel 63. As described above the value of the bonus multiplier 64.1 shown on the display portion 64 has been incremented to show "×3" to reflect that the motion indicator 65 is now in its third revolution of the wheel 63 and that any bonus won will be multiplied by 3 when it is awarded. At this point in the game the motion indicator has 'rotated' through approximately 720° as shown by the illumination of chaser light 68.

Figure 11:
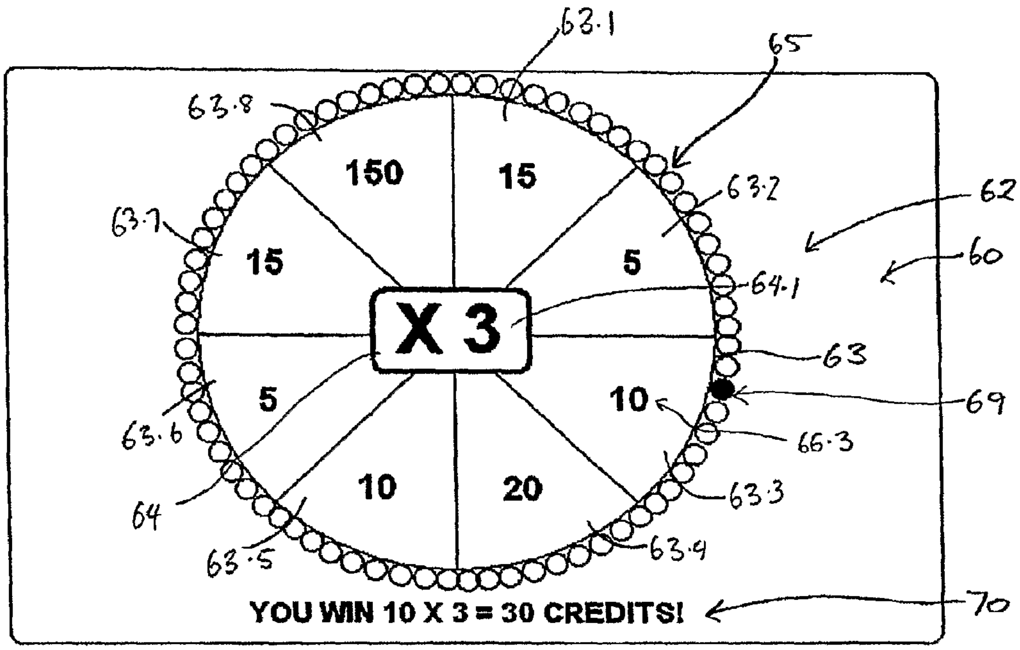
FIG. 11 shows screen display of a first embodiment of a game feature at the end of the game showing its outcome.

FIG. 11 shows a final display in the display 60 of the game feature 62 of the first embodiment. In FIG. 11 the motion indicator 65 has stopped and the final chaser light illuminated is indicated by 'reference numeral 69. As will be familiar to those skilled in the art the position of the last illuminated chaser light 69 relative to the indicator portions 63.1 to 63.8 of the wheel 63 indicates the outcome of the game. In this instance the indicator light 69 corresponds to the indicator portion 63.3 and the award of bonus component 66.3, and the bonus awarded to the player is equal to the bonus 66.3 (i.e. 10) multiplied by the dynamic multiplier 64.1 (×3) which is shown on the display portion 64 of the game feature 62. This game outcome of 30 credits is indicated on the bottom of the display at message 70.

Figure 12:
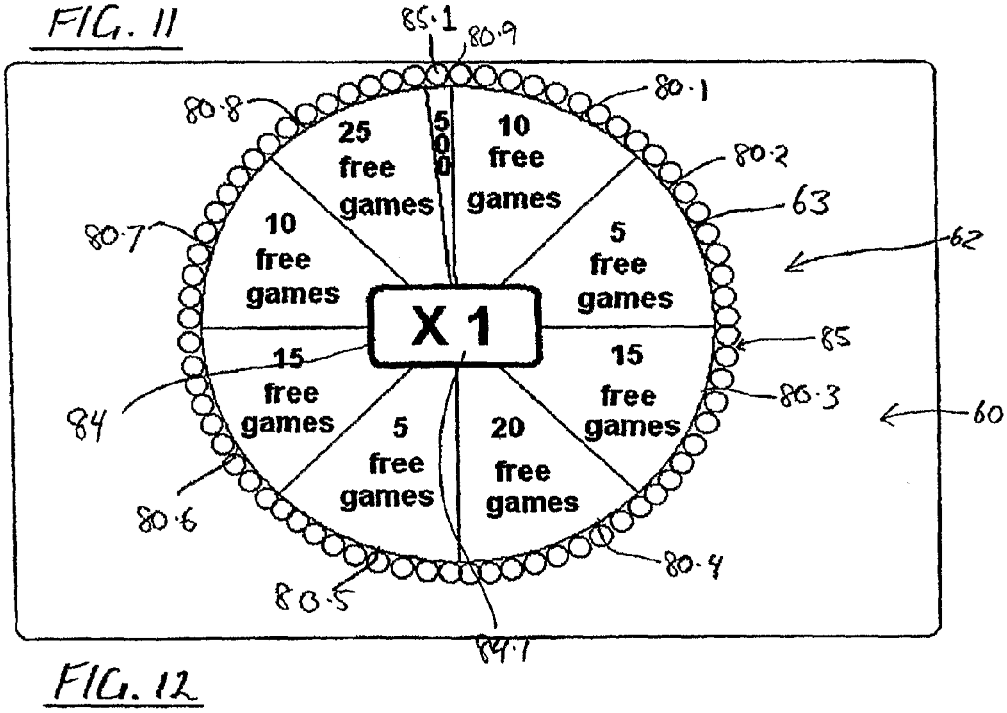
FIG. 12 shows a screen display of a second embodiment of a game feature of a game.

FIG. 12 depicts a screen display of a second embodiment of a game feature according to the present invention. In this embodiment the display 60 depicts game feature 62 including a wheel 63. As in the previous embodiment, the wheel 63 is divided into a plurality of indicator portions 80.1 to 80.9 arranged as sectors of the wheel. Each of the indicator portions 80.1 to 80.9 has displayed thereon a bonus to be awarded in the event that the outcome indicator is aligned with the particular indicator portions 80.1 to 80.9.

In this embodiment, indicator portion 80.9 has a bonus value substantially higher than the other bonus indicator portions. However, in line with the desired properties requirements for wheel type games (mentioned above) the odds of the game outcome resulting in the award of this prize is reduced relative to the other prizes available, by having only one possible outcome which can result in the award of that prize, that is by the motion indicator 85 stopping with the chaser light 85.1 illuminated.

In this embodiment the bonus awarded to a player is a number of free games playable on the gaming machine 10. In the case where the prize is a number of free games the dynamic award modifier shown on the display portion 84 as a multiplier 84.1 may indicate, either that the number of free games won is multiplied by the multiplier value 84.1 displayed, or that the player wins the number of games indicated by the final position of the motion indicator 85 but that during the play of these free games any bonuses won are multiplied by the multiplier value 84.1 depicted on the display 84. In this case the multiplier value 84.1 is incremented in concert with the number of revolutions of the wheel 63 that the motion indicator 85 makes during a game.

Figure 13:
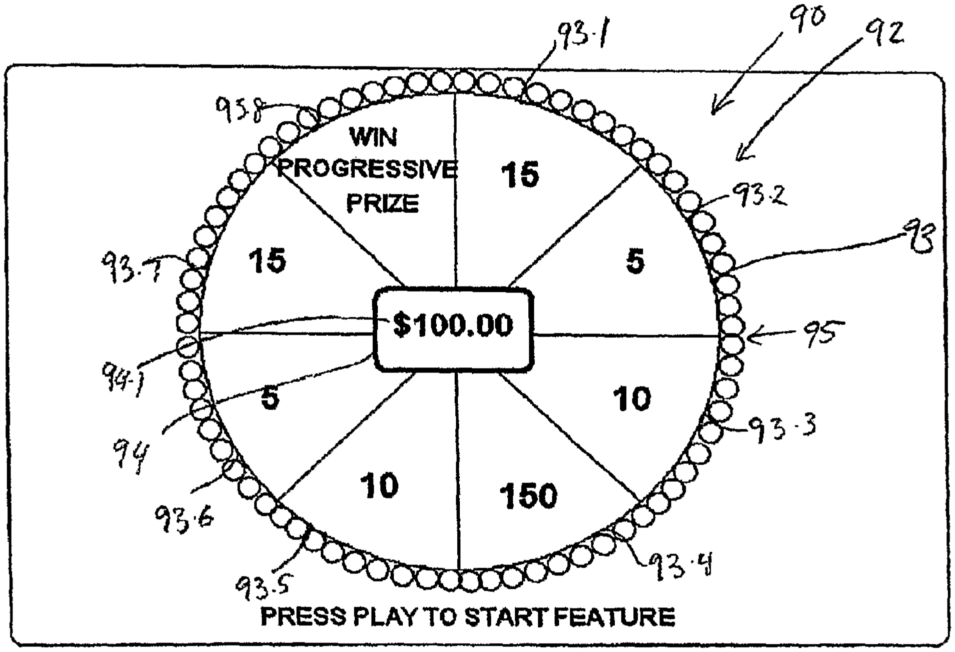
FIG. 13 shows an initial screen display of a third embodiment of a game feature of a game.
Figure 14:
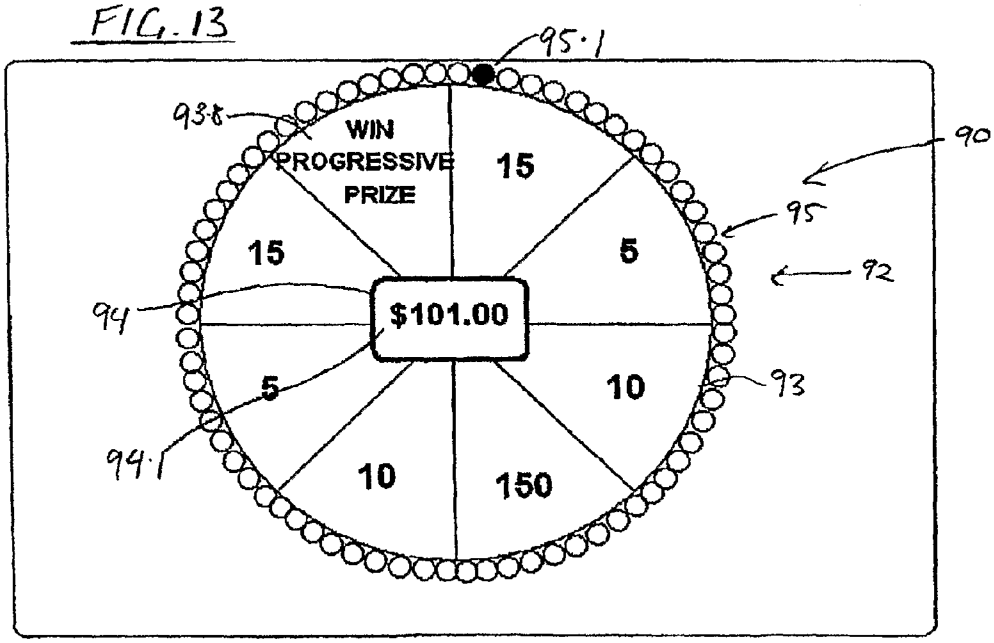
FIG. 14 shows a subsequent screen display of the third embodiment of a game feature of a game.
Figure 15:
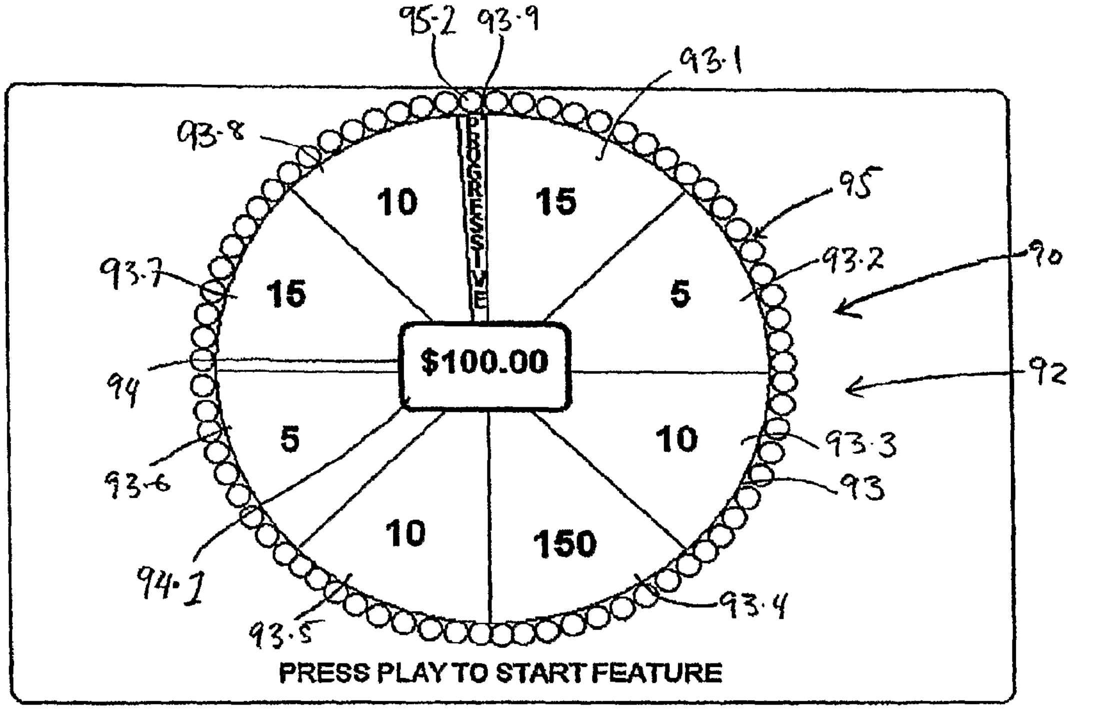
FIG. 15 shows a screen display of a fourth embodiment of a game feature of a game.

FIGS. 13, 14 and 15 show two embodiments of the present invention in which the dynamic award modifier is implemented as a progressive prize or jackpot. In these embodiments, a progressive jackpot value is incremented from a base value on the basis of the number of revolutions that the motion indicator makes around the wheel during a game.

Turning first to FIG. 13 the display 90 shows a game feature 92 comprising a wheel 93 formed from a series of eight indicating portions 93.1 to 93.8 arranged as sectors of the wheel 93. A bonus display portion 94 is provided which displays the current value ($100) of the progressive jackpot 94.1. The game feature also includes a motion indicator 95 comprising a plurality of chaser lights arranged around the outside of the wheel 93.

In order to start the feature game the player presses the "play" button on the gaming machine 10, and the chaser lights of the motion display 95 are activated in a sequential manner to display rotation around the wheel 93. In this embodiment the value of the jackpot 94.1 is incremented in concert with the number of revolutions of the wheel made by the motion indicator 95 during play of the game. That is the progressive prize value is increased by a predetermined amount on the basis of the number or revolutions made by the motion indicator. Alternatively, progressive prize value can be incremented in concert with the displacement, speed of rotation or duration of rotation of the motion indicator such that while the motion indicator is moving the progressive prize increases.

FIG. 14 shows display 90 of the game feature 92 in a condition in which the motion indicator 95 has rotated 365° around the wheel 93. This is indicated by the illumination of chaser light 95.1 and the fact that the jackpot value 94.1 shown on the bonus display portion 94 has now been incremented from $100 to $101.

The outcome of the game is determined by which of the chaser lights of the motion indicator 95 remains illuminated, when the rotation of the motion, indicator stops. If the final illuminated chaser light corresponds to the indicator portion 93.8 the progressive prize 94.1, is won by the player.

It should be noted that in certain embodiments, if the progressive prize is not won in a particular game that the progressive prize value may remain the current accumulated value until the game feature is next triggered. Thus the progressive prize total may be incremented over a large number of games played by multiple players until it becomes a substantial jackpot value.

In certain embodiments, such as that shown in FIG. 15 the indicator portion corresponding to the award of a progressive prize or jackpot may be made smaller relative to the other awardable bonuses to make the award of the progressive prize less likely than the award of other bonus amounts or prizes. This is depicted in FIG. 15, which shows a display 90 very similar to that of FIGS. 13 and 14 having a game feature 92 comprised of a wheel 93 and an associated motion indicator 95. The wheel 93 is divided into a plurality of indicator portions 93.1 to 93.9. The progressive prize will be awarded if the outcome of the game is such that the motion indicator 95 stops with chaser light 95.2 illuminated. This chaser light 95.2 corresponds to the indicator portion 93.9. As in the previous embodiment the value of the progressive prize 94.1 is displayed in the bonus display portion 94 and is incremented in concert with the rotation of the motion indicator.

Notwithstanding that the illustrative embodiments each use a wheel as a motion indicator, the present invention should not be considered to be confined to game features including a wheel device, and can extend to game features including other devices capable of displaying motion.

The motion indicator and/or indicator portions can be arranged to form any desired type of motion, e.g. a line or curved path. However the motion indicator preferably displays a cyclical motion, more preferably along a continuous closed path, with each cycle or lap typically incrementing a counter. It should also be noted that motion indicators and bonus indicators can be combined into a single display feature. In this case motion can be indicated by moving the bonus indicators relative to an outcome marker. In a wheel arrangement this will typically comprise using a stationary outcome marker and rotating the wheel. Moreover, it should also be noted that the game feature can include a mechanical motion indicator. This may comprise a wheel which is "spun" to determine the outcome of the game, or a wheel which is surrounded by chaser lights or another form of surrounding a motion or lap indicator. Accordingly, it should be understood that the motion indicator can display actual motion (as in an embodiment using a real wheel) or virtual or simulated motion (such as in an embodiment using a graphical/video display of the motion indicator), which could be a video representation of a rotating wheel of chaser lights surrounding a stationary wheel.

It should also be noted that a range of parameters of the motion of the motion indicator can be used to adjust the bonus modifier, not just the number of cycles around a path, as in the illustrative embodiments. The dynamic bonus modifier can be varied in concert with a range of other parameters such as the magnitude, speed or duration of the motion of the motion indicator. The dynamic bonus modifier can even be caused to decrease in concert, say, with the slowing down or reversal of the motion indicator.

The adjustment of the bonus modifier "in concert" with the motion indicator can be implemented in a number of forms. For example the adjustment can be made in a continuous manner as the relevant parameter of the movement of the motion indicator changes. The adjustment may be made incrementally as described above. In this case the bonus modifier can be adjusted incrementally as the relevant parameter of the movement of the motion indicator passes one or more predetermined thresholds or milestones. The adjustment of the bonus modifier can be made in accordance with a predetermined function or transformation of the relevant parameter of the movement of the motion indicator, for example the speed of incrementing the bonus modifier can be increased (or decreased) over time, or increase faster depending on the number of completed cycles of a motion indicator.

As will be appreciated the outcome of the bonus game may be generated locally i.e. in the gaming apparatus on which it is played or remotely, e.g. in a game server, such as that depicted in FIG. 4.

Where in the foregoing description reference has been made to integers having known equivalents, then those equivalents are hereby incorporated herein as if individually set forth.

Those skilled in the relevant arts will appreciate, that modifications and additions to the embodiments of the present invention may be made without departing from the scope of the present invention.

It will be understood that the invention disclosed and defined in this specification extends to all alternative combinations of two or more of the individual features mentioned or evident from the text or drawings. All of these different combinations constitute various alternative aspects of the invention.

It will also be understood that the term "comprises" (or its grammatical variants) as used in this specification is equivalent to the term "includes" and should not be taken as excluding the presence of other elements or features.

The invention claimed is:

1. A gaming apparatus comprising:

a game controller;

a display controlled by the controller;

wherein the game controller is configured to:

control the display to display a circle including a motion indicator indicative of movement of an indicator revolving about the circle, wherein the circle is divided into a plurality of sectors each having a corresponding displayed sector value and a region for display of a value of a sector value modifier;

display the value of the sector value modifier in said region, wherein the sector value modifier is incremented in concert with one of a plurality of variables associated with one or more revolutions of the motion indicator about the circle, wherein at least one of the plurality of variables includes a duration of the one or more revolutions of the motion indicator; and when the motion indicator stops revolving about the circle, determine an award corresponding to a combination of the displayed sector value of the sector adjacent at which the motion indicator stops and the value of the sector value modifier.

2. The gaming apparatus as claimed in claim 1, wherein the sector value modifier corresponds to a number of complete revolutions of the motion indicator about the circle.

3. The gaming apparatus as claimed in claim 1, wherein the display of the value of the sector value modifier is continuously updated during its revolution until the one or more revolutions of the motion indicator stops.

4. The gaming apparatus as claimed in claim 1, wherein the region displaying the value of the sector value modifier is disposed at a central portion of the circle.

5. The gaming apparatus as claimed in claim 1, wherein the game controller is further configured to respond to a trigger event in a base game prior to controlling the display to display the circle.

6. The gaming apparatus of claim 5, wherein the trigger event is a predefined winning event occurring in the base game.

7. The gaming apparatus as claimed in claim 1, wherein the controller determines the award by multiplying the displayed sector value of the sector adjacent at which the motion indicator stops by the sector value modifier.

8. The gaming apparatus as claimed in claim 1, wherein the sector value modifier is selected from a group including:

a bonus multiplier;

a progressive jackpot bonus multiplier; and a progressive jackpot.

9. A method for operating a gaming apparatus comprising:

control a display device of the gaming apparatus to display a circle including a motion indicator indicative of movement of an indicator revolving about the circle, wherein the circle is divided into a plurality of sectors each having a corresponding displayed sector value and a region for display of a value of a sector value modifier;

display the value of the sector value modifier in said region, wherein the sector value modifier is incremented in concert with one of a plurality of variables associated with one or more revolutions of the motion indicator about the circle, wherein at least one of the plurality of variables includes a duration of the one or more revolutions of the motion indicator;

revolving the motion indicator about the circle; and when the motion indicator stops revolving, determine an award corresponding to a combination of the displayed sector value of the sector adjacent at which the motion indicator stops and the value of the sector value modifier.

10. The method for operating a gaming apparatus as claimed in claim 9, wherein the sector value modifier corresponds to a number of complete revolutions of the motion indicator about the circle.

11. The method for operating a gaming apparatus as claimed in claim 9, further comprising continuously updating the value of the motion indicator during its revolution until the one or more revolutions of the motion indicator stops.

12. The method for operating a gaming apparatus as claimed in claim 9, further comprising displaying the value of the sector value modifier at a central portion of the circle.

13. The method for operating a gaming apparatus as claimed in claim 9, further comprising responding to a trigger event in a base game prior to controlling the display to display the circle.

14. The method for operating a gaming apparatus as claimed in claim 9, wherein the award is determined by multiplying the displayed sector value of the sector adjacent at which the motion indicator stops by the sector value modifier.

15. The method for operating a gaming apparatus as claimed in claim 9, wherein the sector value modifier is selected from a group including:

a bonus multiplier;

a progressive jackpot bonus multiplier; and a progressive jackpot.

* * * * *